(12) United States Patent
Attar et al.

(10) Patent No.: US 9,001,663 B2
(45) Date of Patent: Apr. 7, 2015

(54) COMMUNICATION TRANSPORT OPTIMIZED FOR DATA CENTER ENVIRONMENT

(75) Inventors: Mohammedreza Alizadeh Attar, Stanford, CA (US); Murari Sridharan, Sammamish, WA (US); Parveen K. Patel, Redmond, WA (US); Balaji Prabhakar, Palo Alto, CA (US); David A. Maltz, Bellevue, WA (US); Jitendra D. Padhye, Kirkland, WA (US); Albert G. Greenberg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 948 days.

(21) Appl. No.: 12/714,266

(22) Filed: Feb. 26, 2010

(65) Prior Publication Data

US 2011/0211449 A1    Sep. 1, 2011

(51) Int. Cl.
*G01R 31/08* (2006.01)
*H04L 12/801* (2013.01)
*H04L 12/825* (2013.01)
*H04L 12/835* (2013.01)

(52) U.S. Cl.
CPC ............... *H04L 47/34* (2013.01); *H04L 47/10* (2013.01); *H04L 47/115* (2013.01); *H04L 47/19* (2013.01); *H04L 47/263* (2013.01); *H04L 47/30* (2013.01)

(58) Field of Classification Search
USPC .............. 370/412, 235, 230, 234, 235.1, 249, 370/230.1, 253; 709/235; 379/221.03, 379/221.07
See application file for complete search history.

(56) References Cited

U.S. PATENT DOCUMENTS

| | | | | |
|---|---|---|---|---|
| 4,769,811 A | * | 9/1988 | Eckberg et al. | ............... 370/236 |
| 4,788,721 A | * | 11/1988 | Krishnan et al. | ......... 379/221.07 |
| 4,849,968 A | * | 7/1989 | Turner | ........................ 370/232 |
| 5,377,327 A | * | 12/1994 | Jain et al. | ...................... 709/235 |
| 6,167,445 A | * | 12/2000 | Gai et al. | ...................... 709/223 |
| 6,219,712 B1 | | 4/2001 | Mann et al. | |
| 6,252,848 B1 | * | 6/2001 | Skirmont | ...................... 370/229 |
| 6,333,917 B1 | * | 12/2001 | Lyon et al. | ................... 370/236 |
| 6,424,624 B1 | * | 7/2002 | Galand et al. | ................. 370/231 |

(Continued)

FOREIGN PATENT DOCUMENTS

| | | |
|---|---|---|
| CN | 1518283 A | 8/2004 |
| EP | 1441288 A2 | 8/2004 |

OTHER PUBLICATIONS

Aggarwal, A. et al., "Understanding the Performance of TCP Pacing," IEEE INFOCOM (2000); p. 1157-1165.

(Continued)

*Primary Examiner* — Phuongchau Ba Nguyen
(74) *Attorney, Agent, or Firm* — Kate Drakos; Micky Minhas

(57) ABSTRACT

Methods and apparatus for congestion control in computer networks achieve high burst tolerance, low latency and high throughput with shallow-buffered switches. A method for controlling congestion includes transmitting a set of data packets on a network connection from a first computing device to a second computing device, identifying each data packet in the set of data packets that experienced congestion on the network connection, sending, by the second computing device to the first computing device, a sequence of bits that represents the number of data packets in the set of data packets that were identified as having experienced congestion, and adjusting a rate of transmitting data packets on the network connection based on the sequence of bits sent to the first computing device.

20 Claims, 9 Drawing Sheets

(56) References Cited

U.S. PATENT DOCUMENTS

| | | | |
|---|---|---|---|
| 6,625,118 B1* | 9/2003 | Hadi Salim et al. | 370/229 |
| 6,741,555 B1* | 5/2004 | Li et al. | 370/229 |
| 6,757,248 B1 | 6/2004 | Li et al. | |
| 6,795,865 B1 | 9/2004 | Bahl et al. | |
| 6,870,809 B1 | 3/2005 | Vaidya et al. | |
| 6,922,390 B1* | 7/2005 | Chapman et al. | 370/229 |
| 6,931,003 B2 | 8/2005 | Anderson | |
| 7,000,025 B1* | 2/2006 | Wilson | 709/235 |
| 7,058,010 B2* | 6/2006 | Chidambaran et al. | 370/218 |
| 7,058,723 B2* | 6/2006 | Wilson | 709/235 |
| 7,369,498 B1 | 5/2008 | Ma et al. | |
| 7,512,066 B2 | 3/2009 | Santos et al. | |
| 7,577,097 B2 | 8/2009 | Tan et al. | |
| 7,885,186 B2* | 2/2011 | MacLean et al. | 370/230.1 |
| 7,936,678 B2* | 5/2011 | Paloheimo et al. | 370/235 |
| 8,427,949 B2* | 4/2013 | Yang | 370/232 |
| 8,446,826 B2* | 5/2013 | Csaszar et al. | 370/232 |
| 2002/0176361 A1 | 11/2002 | Wu et al. | |
| 2003/0081623 A1 | 5/2003 | Kiremidjian et al. | |
| 2004/0148423 A1* | 7/2004 | Key et al. | 709/235 |
| 2005/0018617 A1 | 1/2005 | Jin et al. | |
| 2005/0030896 A1 | 2/2005 | Bahl et al. | |
| 2005/0128951 A1 | 6/2005 | Chawla et al. | |
| 2006/0050640 A1 | 3/2006 | Jin et al. | |
| 2006/0193261 A1* | 8/2006 | Sethi | 370/236 |
| 2008/0049615 A1 | 2/2008 | Bugenhagen | |
| 2008/0225728 A1* | 9/2008 | Plamondon | 370/237 |
| 2008/0304413 A1* | 12/2008 | Briscoe et al. | 370/235 |
| 2008/0304503 A1* | 12/2008 | Blake | 370/412 |
| 2009/0022055 A1 | 1/2009 | Tan et al. | |
| 2009/0207848 A1 | 8/2009 | Kwan et al. | |
| 2012/0051216 A1* | 3/2012 | Zhang et al. | 370/230 |

OTHER PUBLICATIONS

Al-Fares, M. et al., "A Scalable, Commodity Data Center Network Architecture," SIGCOMM (2008); p. 63-74.
Appenzeller, G. et al., "Sizing Router Buffers," SIGCOMM (2004) p. 281-292.
Brakmo, L. et al., "TCP Vegas: New Techniques for Congestion Detection and Avoidance," SIGCOMM (1994); p. 24-35.
Chen, Y. et al., "Understanding TCP Incase Throughput Collapse in Datacenter Networks," WREN (2009) p. 73-82.
Dukkipati, N. et al., "Processor Sharing Flows in the Internet," IFIP International Federation for Information Processing (2005); p. 267-281.
Floyd, S. Red: "Discussions of Setting Parameters," (Nov. 1997) email message; 3 pgs.
Floyd, S., "HighSpeed TCP for Large Congestion Windows," The Internet Society (2003); p. 1-34.
Floyd, S. et al., "Adaptive RED: An Algorithm for Increasing the Robustness of RED's Active Queue Management," AT&T Center for Internet Research at ICSI (2001); p. 1-12.
Floyd, S. et al., "Random Early Detection Gateways for Congestion Avoidance," IEEE/ACM Transactions on Networking (Aug. 1993); v. 1, No. 4, p. 397-413.
Floyd, S. et al., "The Synchronization of Periodic Routing Messages," IEEE/ACM Transactions on Networking (Apr. 1994); v. 2, No. 2, p. 122-136.
Gorinsky, S. et al., "Link Buffer Sizing: A New Look at the Old Problem," ISCC (2005); 8 pgs.
Greenberg, A. et al., "VL2: A Scalable and Flexible Data Center Network," SIGCOMM (Aug. 2009) p. 51-62.
Gu; Y. et al., "Congestion Control for Small Buffer High Speed Networks," IEEE INFOCOM (2007); p. 1037-1045.
Guo, C., et al. "BCube: A High Performance, Server-centric Network Architecture for Modular Data Centers," SIGCOMM (Aug. 2009); p. 63-74.
Ha, S. et al., "CUBIC: A New TCP-Friendly High-Speed TCP Vairant," International Workshop on Protocols for Fast and Long Distance Networks (2005); p. 64-74.
Hamilton, J., "On Designing and Deploying Internet-Scale Services," LISA (2007); p. 231-242.
Kabbani, A. et al., "In Defense of TCP," Workshop on the future of TCP, Stanford Univ., Apr. 1, 2008.
Kelly, F. et al., "Public Review for Stability and Fairness of Explicit Congestion Control with Small Buffers," ACM SIGCOMM (Jul. 2008); v. 28, No. 3, p. 51-62.
Kohavi, R. et al., "Practical Guide to Controlled Experiments on the Web: Listen to Your Customers not to the HiPPO," KDD (Aug. 2007); p. 959-967.
Li, Y. et al., "Experimental Evaluation of TCP Protocols for High-Speed Networks," IEEE/ACM Transactions on Networking (Oct. 2007); v. 15, No. 5, p. 1109-1122.
Lin, D et al., "Dynamics of Random Early Detection," SIGCOMM (1997) p. 127-137.
Raina, G. et al., "Part II: Control Theory for Buffer Sizing," ACM SIGCOMM (Jul. 2005); v. 35, No. 2, p. 79-82.
Ramakrishnan, K. et al., "The Addition of Explicit Congestion Notification (ECN) to IP," The Internet Society (2001); p. 1-63.
Ramakrishan, K. et al., "A Binary Feedback Scheme for Congestion Avoidance in Computer Networks," ACM Transactions on Computer Systems (May 1990) v. 8, No. 2, p. 158-181.
Vasudevan, V. et al., "Safe and Effective Fine-grained TCP Retransmissions for Datacenter Communication," SIGCOMM (Aug. 2009); 12 pgs.
Wei, D. et al., "Fast TCP: Motivation, Architecture, Algorithms, Performance," IEEE/ACM Transactions on Networking (Dec. 2006); v. 14, No. 6, p. 1246-1259.
Smiljanić, Aleksandra, "Flexible Bandwidth Allocation in High-Capacity Packet Switches" IEEE/ACM Transactions on Networking, vol. 10, No. 2, Apr. 2002, pp. 287-289.
Minkenberg, Cyriel et al. "Speculative Flow Control for High-Radix Datacenter Interconnect Routers"; http://ieeexplore.ieee.org/stamp/stamp.jsp?arnumber=04227988, Mar. 2007.
Cho, Soohyun et al. "Adaptive TCP for Effective and Fair Utilization of High Bandwidth-Delay Product Networks", http://www.cs.tamu.edu/academics/tr/tamu-cs-tr-2005-11-13, Nov. 2005.
Chiu, Dah-Ming et al. "Analysis of the Increase and Decrease Algorithms for Congestion Avoidance in Computer Networks" Computer Networks and ISDN Systems, vol. 17, No. 1, Jun. 10, 1989, pp. 1-14.
Barroso, L. et al., "The Datacenter as a computer: An Introduction to the Design of Warehouse Scale Machines", 2009, pp. 119.
Hollot, C.V. et al, "On Designing Improved Controllers for AQM Routers Supporting TCP Flows", Dec. 2003, pp. 9.
Leith, et al., "Experimental evaluation of Cubic-TCP", 2007, pp. 9.
Pan, et al., "QCN: Quantized Congestion Notification", 2007, pp. 26.
Tan, et al, "A Compound TCP Approach for High-speed and Long Distance Networks", 2006, pp. 12.
International Search Report and Written Opinion; PCT Application No. PCT/US2011/025620; Filing date: Feb. 21, 2011; Mailing data Oct. 27, 2011; 9 pages.
Rothschild, Jeff, "High Performance at Massive Scale; Lessons Learned at Facebook", this video was previously provided on compact disc to the USPTO on Mar. 22, 2010 and is also available at http://video-jsoe.ucsd.edu/calit2/JeffRothschildFacebook.wmv, Oct. 8, 2009.
"Search Report and Office Action Issued in Taiwan Patent Application No. 100102902", Mailed Date: Mar. 24, 2014, Filed Date: Jan. 26, 2011, 7 Pages.
"First Office Action and Search Report Issued in Chinese Patent Application No. 201180011082.4", Mailed Date: May 4, 2014, Filed Date: Feb. 21, 2011, 16 Pages.
"Second Office Action and Search Report Issued in Chinese Patent Application No. 201180011082.4", Mailed Date: Jan. 16, 2015, 16 Pages.

* cited by examiner

| ECN Marks | DCTCP | TCP |
|---|---|---|
| 1 0 1 1 1 1 0 1 1 1 | Cut window by 40% | Cut window by 50% |
| 0 0 0 0 0 0 0 0 0 1 | Cut window by 5% | Cut window by 50% |

United States Patent

COMMUNICATION TRANSPORT OPTIMIZED FOR DATA CENTER ENVIRONMENT

FIELD OF THE INVENTION

This invention relates to congestion control in computer networks and, more particularly, to methods and apparatus for controlling congestion in a data center environment. However, the invention is not limited to use in a data center environment.

BACKGROUND

Data centers may include several hundred or several thousand servers interconnected by high-speed switches. Cloud data centers host diverse applications, mixing in the same network many workflows that require small, predictable latency with others requiring large, sustained throughput. In recent years, data centers have transformed computing, with large scale consolidation of enterprise IT into data center hubs, and with the emergence of cloud computing service providers. A consistent theme in data center design has been to build highly available, high performance computing and storage infrastructure using low cost, commodity components. In particular, low-cost switches are common, providing up to 48 ports at 1 Gbps, at a price under $2,000. Several recent research proposals envision creating economical, easy-to-manage data centers using novel architectures built on such commodity switches.

Whether these proposals are realistic depends in large part on how well the commodity switches handle the traffic of real data center applications. It has been discovered that soft real-time applications, such as web search, retail, advertising, and recommendation systems that have driven much of the data center construction, generate a diverse mix of short flows and long flows. These applications require the following from the data center network: low latency for short flows, high burst tolerance, and high utilization for long flows.

The first two requirements stem from the Partition/Aggregate workflow pattern that many of these applications use. The soft real-time deadlines for end results translate into latency targets for the individual tasks in the workflow. These latency targets vary from about 10 ms to about 100 ms, and tasks not completed before their deadlines are cancelled, thereby adversely affecting the final result. Thus, application requirements for low latency directly impact the quality of the result returned and thus revenue. Reducing network latency allows application developers to shift more cycles to the algorithms that improve relevance and end user experience.

The third requirement, high utilization for large flows, stems from the need to continuously update internal data structures of these applications, as the freshness of this data also affects the quality of results. High throughput for long flows that update data is thus as essential as low latency and burst tolerance.

In this environment, today's state of the art TCP protocol falls short. Accordingly, there is a need for improved methods and apparatus for efficient packet transport in computer networks, such as data centers.

SUMMARY

The present invention provides methods and apparatus for congestion control which achieve high burst tolerance, low latency and high throughput with shallow-buffered switches. To meet the requirements of a diverse mix of short flows and long flows, switch buffers are maintained with small queue occupancies, while high throughput is maintained for long flows. These goals are achieved primarily by reacting to congestion based on the extent of congestion. A congestion control algorithm uses a marking scheme at switches that sets a marking bit in transmitted data packets as soon as the buffer occupancy exceeds a small, fixed threshold. The sender reacts by reducing the rate of transmitting data packets by a factor that depends on the fraction of marked packets. The larger the fraction, the larger the decrease in transmission rate. The transmission rate can be controlled by adjusting the length of a transmission window. The sender derives multi-bit feedback from the single-bit marking information in each packet of a set of transmitted packets.

According to a first aspect of the invention, a method is provided for controlling congestion on a network connection between a first computing device and a second computing device. The method comprises: transmitting a set of data packets on the network connection from the first computing device to the second computing device; identifying each data packet in the set of data packets that experienced congestion on the network connection; sending, by the second computing device to the first computing device, a sequence of bits that represents the number of data packets in the set of data packets that were identified as having experienced congestion; and adjusting a rate of transmitting data packets on the network connection based on the sequence of bits sent to the first computing device.

According to a second aspect of the invention, a method is provided for controlling congestion on a network connection between a first computing device and a second computing device. The method comprises: transmitting, by the first computing device, a set of data packets on the network connection to the second computing device; marking data packets in the set of transmitted data packets if a queue size in a device on the network connection exceeds a predetermined, single value threshold K; receiving, at the first computing device, information identifying data packets in the set of transmitted data packets that were marked; estimating, at the first computing device, a measure of congestion on the network connection based on the data packets in the set of data packets that were identified as marked; and adjusting, by the first computing device, a rate of transmitting data packets on the network connection based on the estimated measure of congestion.

According to a third aspect of the invention, a method is provided for controlling congestion on a network connection between a first computing device and a second computing device. The method comprises: transmitting a set of data packets on the network connection from the first computing device to the second computing device; marking data packets in the set of transmitted data packets if a queue size in a device on the network connection exceeds a predetermined, single value threshold K; sending, by the second computing device to the first computing device, a sequence of bits that represents the number of data packets in the set of data packets that were marked; estimating a measure of congestion on the network connection by determining, based on the sequence of bits, a fraction of data packets in the set of transmitted data packets that were marked; adjusting a rate of transmitting data packets on the network connection based on the fraction of marked data packets in the set of transmitted data packets; and updating the estimated measure of congestion on the network connection for each set of transmitted data packets.

DETAILED DESCRIPTION

Figure 1:
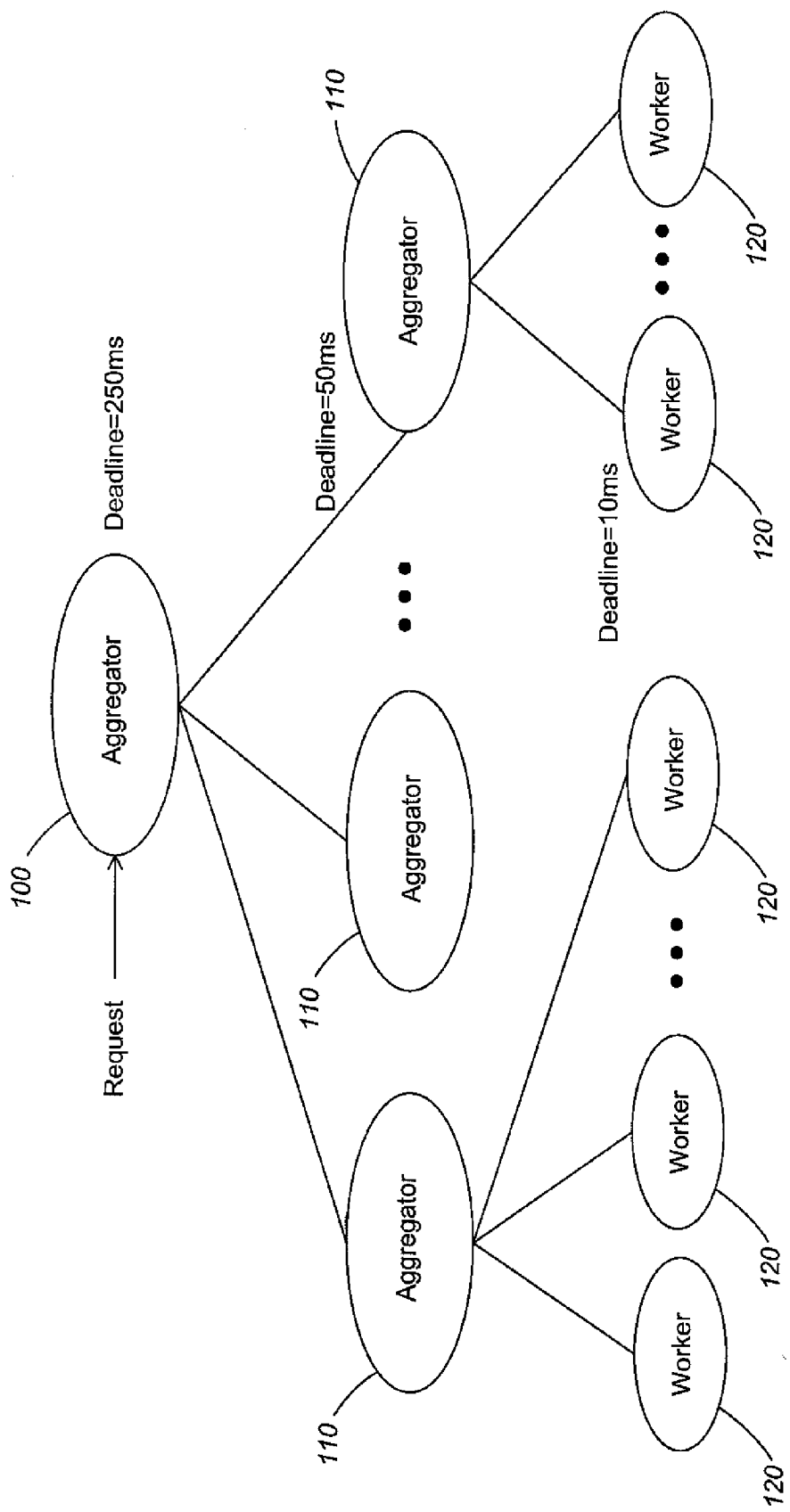
FIG. 1 is a schematic diagram that illustrates a Partition/Aggregate workflow pattern.

The Partition/Aggregate workflow pattern shown in FIG. 1 is the foundation of many large scale web applications executed in data centers. The Partition/Aggregate workflow pattern includes a top level aggregator 100, lower level aggregators 110 connected to top level aggregator 100, and workers 120 connected to respective lower level aggregators 110. Aggregators 100 and 110, and workers 120 may each be implemented as a server. The workflow pattern may employ any number of levels.

A request is received by top level aggregator 100. Requests from higher layers of the application are broken into pieces and assigned to workers in lower levels. The responses of the workers are aggregated to produce a result. Web search, social network content composition and advertisement selection may be based on this workflow pattern. For interactive, soft real-time applications such as these, latency is a key metric, with total permissible latency being determined, for example, by customer impact studies. After subtracting typical Internet and rendering delays, the backend part of the application is typically allocated between 230-300 ms.

Many applications have a multi-layer Partition/Aggregate workflow pattern, with lags at one layer delaying the initiation of others. Further, responding to a request may require iteratively invoking the workflow pattern, with an aggregator making serial requests to the workers below to prepare a response. For example, in a web search, a query may be sent to many aggregators and workers, each responsible for a different part of the index. Based on the replies, an aggregator may refine the query and send the refined query to improve the relevance of the result. Lagging instances of the Partition/Aggregate workflow can thus add up to threaten the total latency for queries.

To prevent the total latency from being violated, worker nodes are typically assigned tight deadlines, usually on the order of 10-100 ms. Examples of deadlines for completing work are shown in FIG. 1. When a node misses its deadline, the computation continues without that response, lowering the quality of the result.

The present invention is based on an understanding of performance impairments observed in a data center. A data center may include multiple racks of servers. Each rack may include multiple servers, for example 44 servers, connected to a switch. The switches may be shallow-buffered, shared memory switches, each with 4 MB of buffer shared among 48 ports operating at 1 Gbps and two ports operating at 10 Gbps. The switches are shared-memory switches that exploit statistical multiplexing gain through the use of logically common packet buffers available to all switch ports. Packets arriving on an interface are stored in a high-speed, multi-ported memory shared by all the interfaces. Memory from the shared pool is dynamically allocated to a packet by a memory management unit (MMU). The MMU attempts to give each interface as much memory as it needs while preventing unfairness by dynamically adjusting the maximum amount of memory any one interface can take. If a packet must be queued for an outgoing interface, but the interface has reached its maximum memory allocation or the shared memory pool is depleted, then the packet is dropped. Large multi-ported memories are expensive, so most low-cost switches are shallow buffered, with packet buffer being the scarcest resource.

Figure 2:
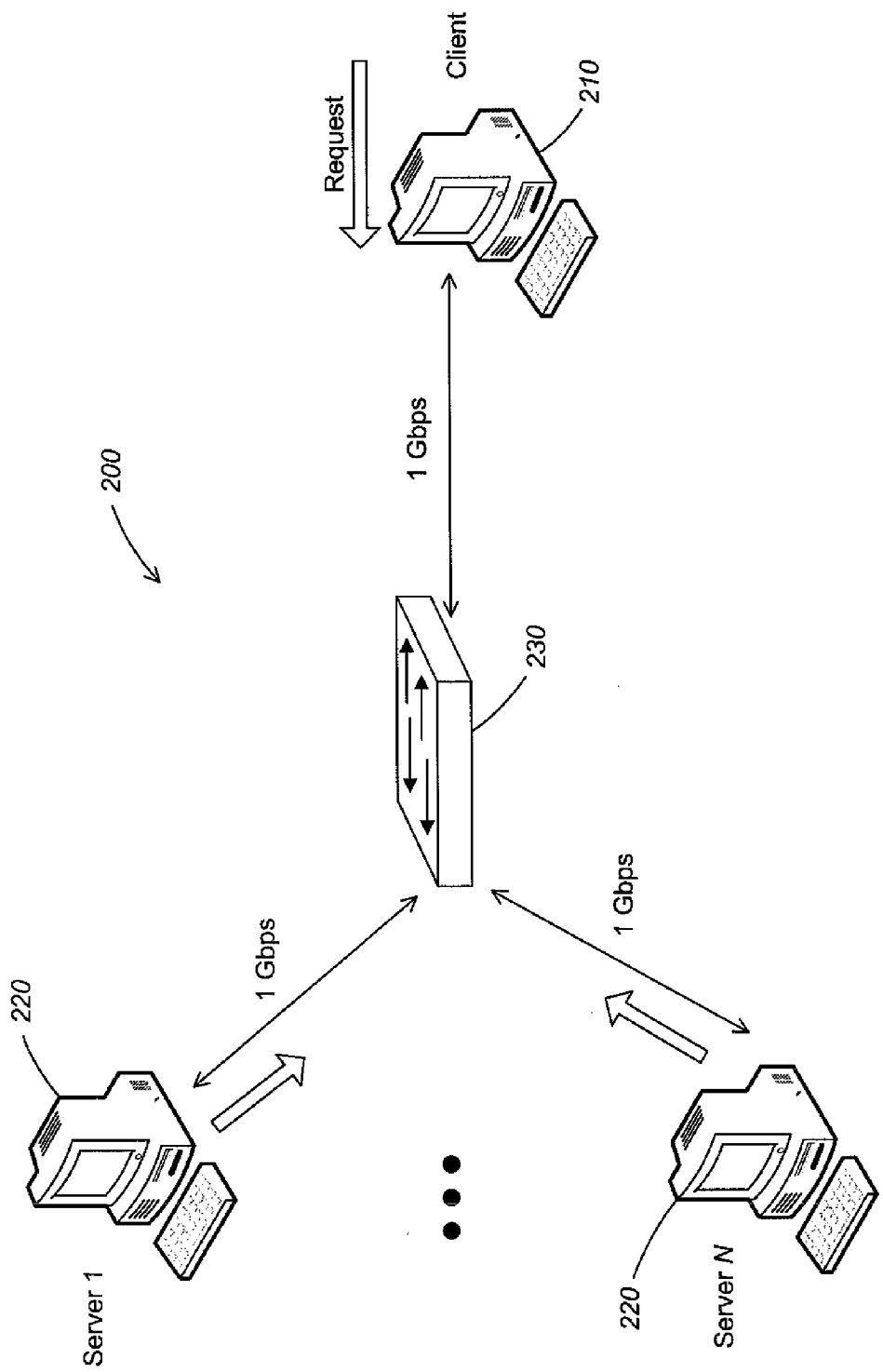
FIG. 2 is a block diagram that illustrates incast congestion at a switch connected to the aggregator.

If many data flows converge on the same interface of a switch over a short period of time, the packets may exhaust either the switch memory or the maximum permitted buffer for that interface, resulting in packet losses for some of the flows. This can occur even if the flows are small. A traffic pattern which results in packet losses arises naturally from the use of the Partition/Aggregate workflow pattern, as the request for data synchronizes the workers' responses and creates incast at the queue of the switch port connected to the aggregator. A diagram of a network 200 shown in FIG. 2 illustrates incast congestion. A client 210 sends a request to N servers 220 via a switch 230. The network 200 may operate on the Partition/Aggregate workflow model illustrated in FIG. 1, with client 210 corresponding to aggregator 100 and servers 220 corresponding to lower level aggregators 110. The servers 220 may send responses at the same time, causing incast congestion at switch 230. Incast-like problems degrade performance and, more importantly, user experience. A response that experiences incast congestion is likely to miss the aggregator deadline and be left out of the final results.

Long-lived TCP flows cause the length of the bottleneck queue to grow until packets are dropped. When long and short flows traverse the same queue, two impairments occur. First, packet loss on the short flows can cause incast problems as described above. Second, there is a queue buildup impairment. Even when no packets are lost, the short flows experience increased latency, as they are in the queue behind packets of the large flows. Every worker is handling both query traffic and background traffic, so this traffic pattern occurs frequently. Thus, an issue is the occupancy of the queue caused by other flows—the background traffic—with losses occurring when the long flows and short flows coincide. Since latency is caused by queuing, a solution is to reduce the size of the queues.

Given the mix of long and short flows in data centers, it is common for short flows on one port to be impacted by activity on any of the many other ports. Surprisingly, the loss rate of short flows in this traffic pattern depends on the number of long flows traversing other ports. The explanation is that the activity on the different ports is coupled by the shared memory pool. The long TCP flows build up queues on their respective interfaces. Since buffer space is a shared resource, the queue buildup reduces the amount of buffer space available to absorb bursts of traffic from Partition/Aggregate traffic. This impairment is termed "buffer pressure." The result is packet loss and timeouts, as in incast, but without requiring synchronized flows.

A congestion control algorithm, known as the DCTCP algorithm, addresses the performance impairments described above. A goal of the DCTCP algorithm is to achieve high burst tolerance, low latency, and high throughput with commodity shallow-buffered switches. To this end, the DCTCP is designed to operate with small queue occupancies and without loss of throughput.

Figure 3:
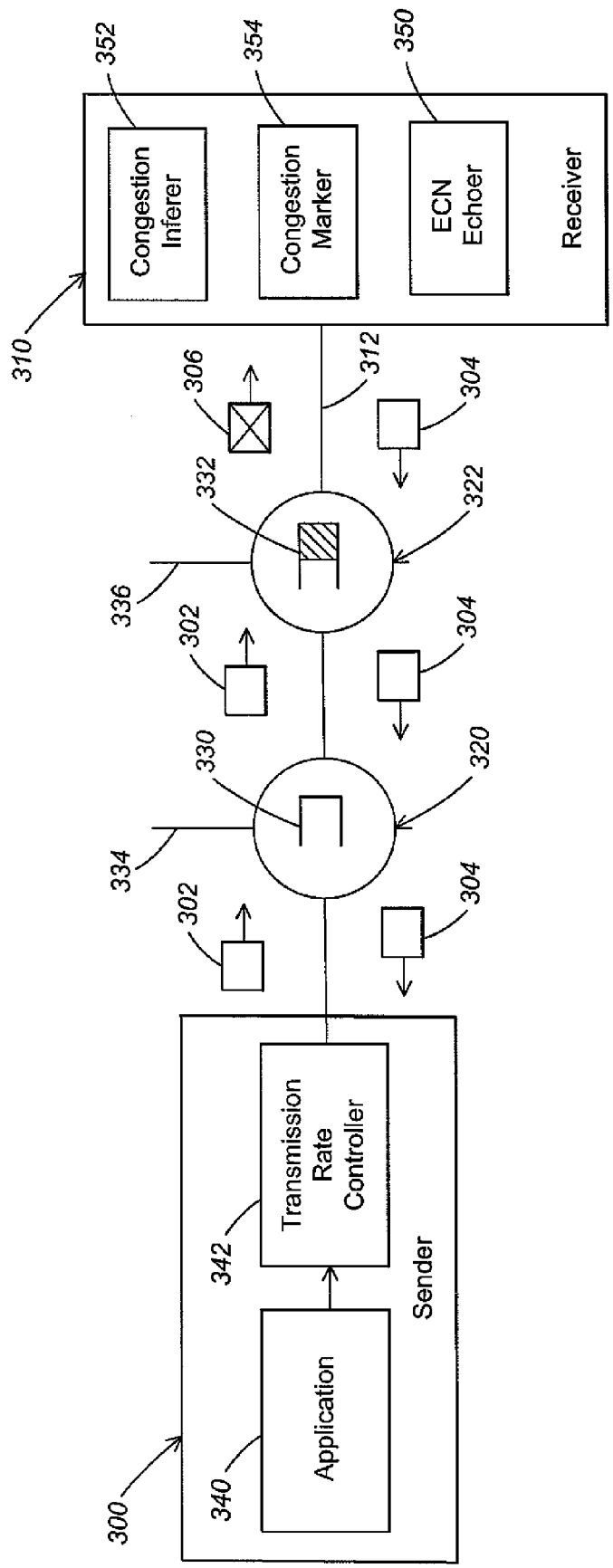
FIG. 3 is a block diagram of a computer network including a sender that transmits data packets to a receiver, in accordance with embodiments of the invention.

A simplified block diagram of network components involved in operation of the DCTCP algorithm is shown in FIG. 3. A sender 300 transmits data packets 302 to a receiver 310 on a network connection 312 that includes switches 320 and 322. Switch 320 includes a buffer 330, and switch 322 includes a buffer 332. Each of buffers 330 and 332 may have a queue of data packets awaiting transmission. Switches 320 and 322 may receive additional data flows on one or more interfaces 334 and 336, respectively. A data packet 306 may be marked by switch 322 when a queue size in buffer 332 exceeds a threshold, as described below. An example implementation of marking a data packet 306 is to set the Explicit Congestion Notification code point CE as defined in IETF RFC 3168 "The Addition of Explicit Congestion Notification (ECN) to IP". Receiver 310 may acknowledge data packets 302 by sending ACK packets 304 to sender 300. Each ACK packet may have an ECN-Echo flag set to indicate that congestion was experienced by the corresponding received packet.

As shown in FIG. 3, sender 300 may include an application 340 that wishes to transmit data packets to receiver 310 and a transmission rate controller 342 that controls the transmission rate of data packets as described below. To control congestion, receiver 310 includes an ECN-Echoer to control setting of ECN-Echo flags in ACK packets as described below. In addition to or in place of ECN-Echoer 350, receiver 310 may include a congestion inferer 352 and a congestion marker 354 as described below. In the context of a data center, sender 300 and receiver 310 may be servers, such that sender 300 is a first computing device and receiver 310 is a second computing device. It will be understood that FIG. 3 illustrates only one connection of multiple connections and two servers of multiple servers in a data center environment.

The DCTCP algorithm achieves the goals of high burst tolerance, low latency and high throughput by reacting to congestion based on the extent of congestion. The algorithm uses a marking scheme at switches, which sets the Congestion Experienced (CE) codepoint of data packets as soon as the buffer occupancy exceeds a fixed small threshold. The sender reacts by reducing the data transmission rate by a factor that depends on the fraction of marked packets. The larger the fraction of marked packets, the larger the decrease in transmission rate. In some embodiments, the decrease in transmission rate may be in proportion to the fraction of marked packets.

The algorithm derives multi-bit feedback from single bits contained in the marked or unmarked state of each data packet in a set of data packets. The set of data packets may be the data packets transmitted during a transmission window, also known as a congestion window, cwnd. Since the DCTCP algorithm requires the network to provide only single-bit feedback, much of the functionality that is already available in modern TCP stacks and switches can be utilized.

The need for reacting based on the extent of congestion is particularly acute in the absence of large-scale statistical multiplexing. Standard TCP reduces its window size by a factor of two when it receives an ECN notification, that is, TCP-ECN reacts to a single marked packet per congestion window. In effect, TCP reacts to the presence of congestion, not to its extent. Reducing the window in half causes a large mismatch between the input rate to the link and the available capacity. In the high speed data center environment, where only a small number of flows share the buffer, this leads to buffer underflows and loss of throughput.

Figure 4:
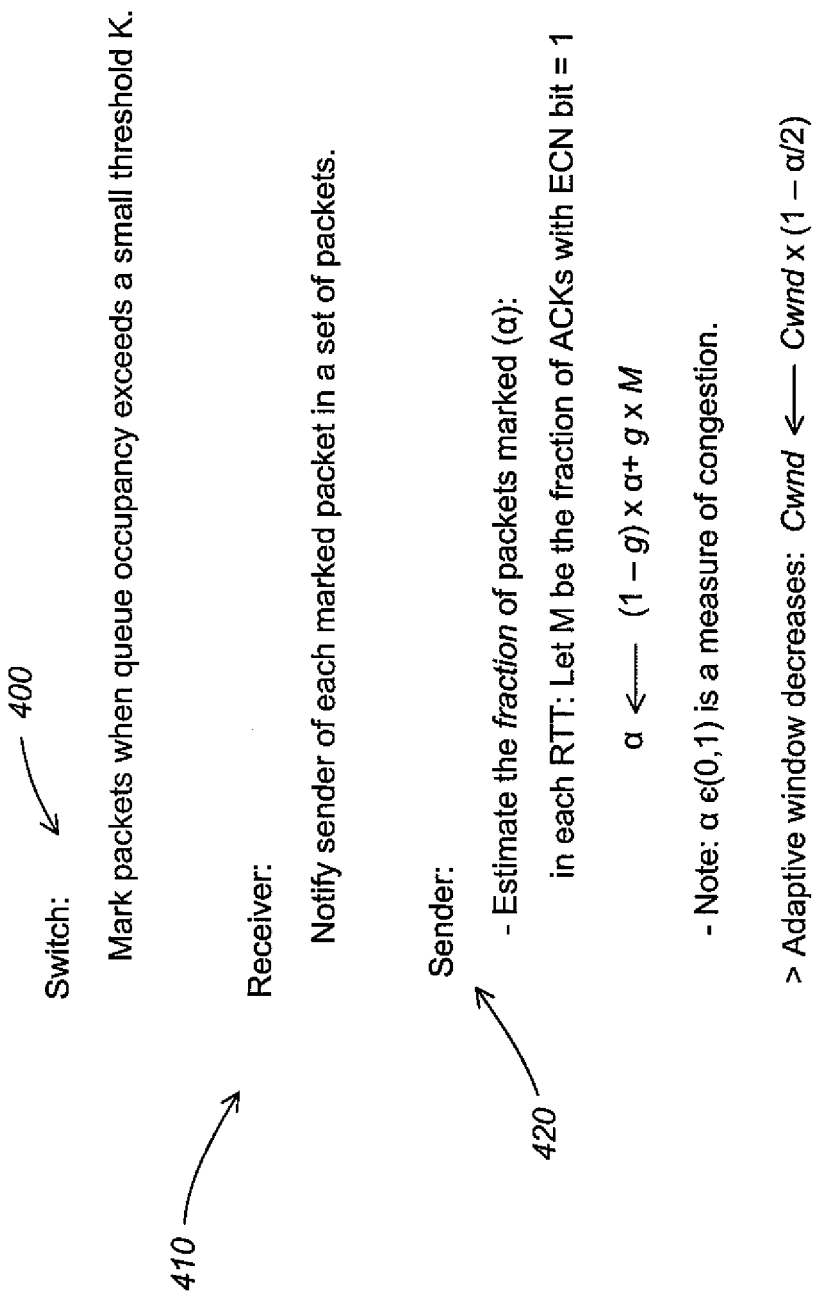
FIG. 4 illustrates a congestion control algorithm in accordance with embodiments of the invention.
Figure 5:
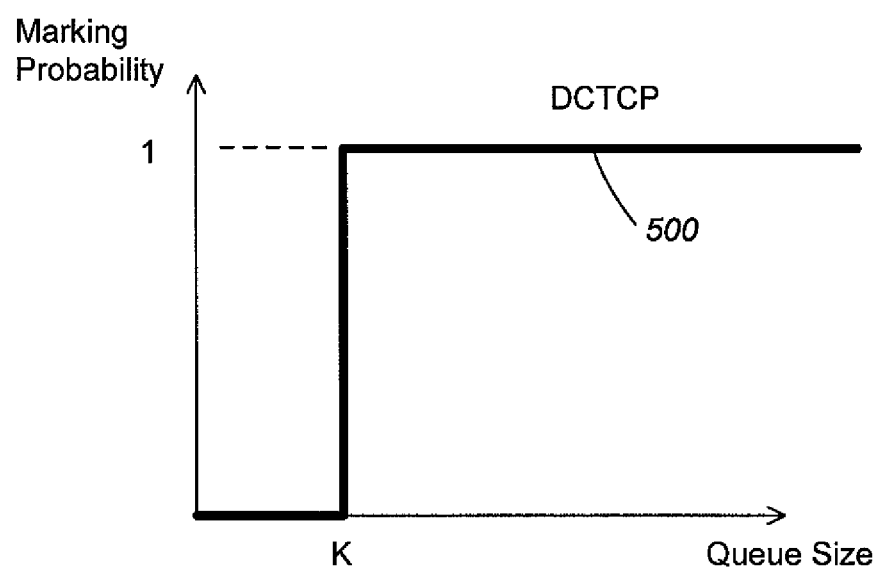
FIG. 5 illustrates marking of data packets by a switch in accordance with embodiments of the invention.

The DCTCP algorithm has three main components as summarized in FIG. 4. A first component 400 is the marking of data packets at the switch 320, 322. The algorithm employs an active queue management scheme, as shown in FIG. 5. A marking threshold K is the only parameter. As indicated by marking characteristic 500, an arriving packet is marked, for example with the CE codepoint, if the queue occupancy is greater than threshold K upon its arrival. Otherwise, the arriving packet is not marked. The DCTCP marking scheme is motivated by the need to minimize queue buildup. The DCTCP algorithm aggressively marks packets when a queue overshoot is sensed, thus allowing senders to be notified of the queue overshoot as fast as possible.

A second component 410 of the DCTCP algorithm is the ECN-Echo at the receiver 310. The DCTCP receiver differs from a conventional TCP receiver in the way information in the CE codepoints is conveyed back to the sender. A TCP receiver sets the ECN-Echo flag in a series of ACK packets until it receives confirmation from the sender that the congestion notification has been received. As described in RFC 3168, an explicit goal of the TCP receiver is to notify the TCP sender of at most one congestion signal per round trip time (RTT). A DCTCP receiver, however, accurately conveys the exact sequence of marked packets back to the sender. One way to achieve this is to acknowledge every packet, setting the ECN-Echo flag if and only if the packet has a marked CE codepoint.

Figure 7:
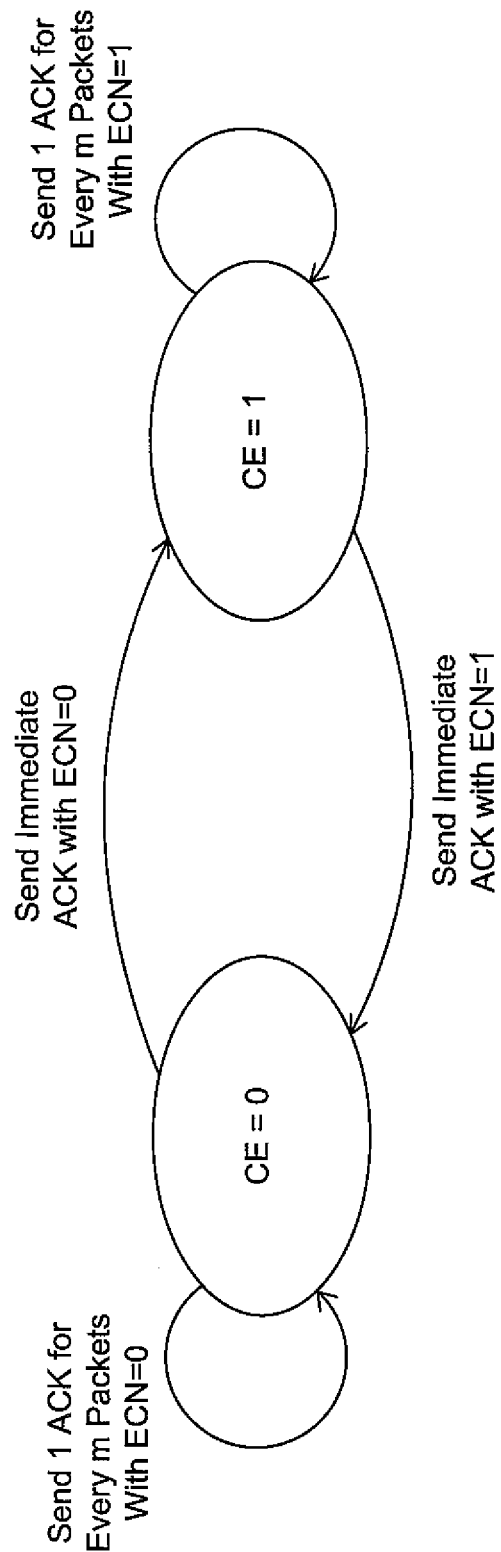
FIG. 7 is a state diagram that controls setting of congestion bits in ACK packets in the case of delayed acknowledgements.

However, delayed acknowledgements are important for a variety of reasons, including reducing the load on the sender. Delayed acknowledgements use one accumulative ACK packet for every m consecutively received packets. To use delayed acknowledgements, the DCTCP receiver uses a two state state-machine shown in FIG. 7 to determine whether to send an ACK packet with the appropriate ECN-Echo bit. The states correspond to whether the last received packet was marked with the CE codepoint or not. Thus, the conventional delayed ACK is modified by sending an ACK packet each time the marker bit of a received packet changes state. Since the sender knows how many transmitted packets each ACK packet covers, it can exactly reconstruct the marked packets received by the receiver.

A third component 420 of the DCTCP algorithm is the controller at the sender 300. The sender maintains a running estimate of the fraction of packets that are marked, called α, which is updated once for every window of data (roughly one RTT) as follows:

$$\alpha \leftarrow (1-g) \times \alpha + g \times F \qquad (1)$$

where F is the fraction of packets that were marked in the last window of data, and g, having a value in the range of 0-1, is the weight given to new samples with respect to the previous estimation of α.

It may be noted that α is a real number having a value between 0 and 1. Given that the sender receives marks for every packet when the queue length is greater than K and does not receive any marks when the queue length is less than K, equation (1) implies that α is an estimate of the probability that the queue is greater than K. Thus, a value of α close to 0 indicates a low level of congestion, and a value of α close to 1 indicates a high level of congestion.

A DCTCP sender differs from a TCP sender with respect to its reaction to receiving an ACK packet with the ECN-Echo flag set, as described above. Other features of TCP, such as slow start, additive increase in congestion avoidance, and recovery from packet loss are left unchanged. While TCP cuts its window size by a factor of two in response to a marked ACK packet, the DCTCP algorithm uses α to reduce its window, cwnd, as follows.

$$cwnd \leftarrow cwnd \times (1-\alpha/2) \quad (2)$$

Thus, when the value of α is near 0 (low congestion), the window is slightly reduced. The DCTCP senders start reducing their window size as soon as the queue size exceeds K. The DCTCP algorithm thus maintains low queue size, while ensuring high throughput. When the value of α is near 1 (high congestion), the DCTCP algorithm reduces its window by half, as in TCP.

The sender has been described as adjusting its transmission window, or congestion window, based on the fraction of marked data packets in a set of data packets. However, the invention is not limited in this respect, and other methods of adjusting transmission rate may be utilized within the scope of the invention.

The DCTCP algorithm involves selection of threshold K, the queue size threshold that triggers marking in switches, and weight g, the weight given to new samples of α with respect to a previous estimation of α. The values of threshold K and weight g may be chosen based on the following guidelines.

$$K > \frac{C \times RTT}{7} \quad (3)$$

$$g < \frac{1.386}{\sqrt{2(C \times RTT + K)}} \quad (4)$$

where C is the capacity of the network connection in packets per second, RTT is round trip time in seconds and threshold K is in packets. Allowances may be made for packet bursts when selecting the value of threshold K. For example, while Equation (3) may suggest a marking threshold K as low as 20 packets for 10 Gbps, a more conservative marking threshold larger than 60 packets may be used to avoid loss of throughput. This excess is in line with burst sizes of 30 to 40 packets observed at 10 Gbps.

Based on packet bursts observed at 1 Gbps and 10 Gbps, and the total amount of available buffering in switches, a marking threshold K of 20 packets for 1 Gbps ports and a marking threshold K of 65 packets for 10 Gbps ports may be utilized, and weight g may be set to 1/16. It will be understood that these values are given by way of example only and are not limiting as to the scope of the present invention. Similarly, it will be understood that threshold K can be denoted in units of bytes or cells of buffer space as well as packets.

DCTCP senders start reacting as soon as the queue length on an interface exceeds the threshold K. This reduces queuing delays on congested switch ports, which minimizes the impact of long flows on the completion time of small flows. Also, more buffer space is available as headroom to absorb transient microbursts, greatly mitigating the costly packet losses that can lead to timeouts.

The DCTCP algorithm also solves the buffer pressure problem because a congested port's queue length does not grow exceedingly large. Therefore, in shared memory switches a few congested ports will not exhaust the buffer resources, thereby harming flows passing through other ports.

The incast scenario, where a large number of synchronized small flows reach the same queue, is the most difficult to handle. If the number of small flows is so high that even one packet from each flow is sufficient to overwhelm the buffer on a synchronized burst, any congestion control scheme that does not attempt to schedule traffic can do little to avoid packet loss.

However, in practice, each flow has several packets to transmit and their windows build up over multiple RTTs. It is often bursts in subsequent RTTs that lead to packet loss. Because the DCTCP algorithm starts marking early and aggressively based on instantaneous queue length, DCTCP senders receive enough marks during the first one or two RTTs to reduce the size of follow-up bursts, thereby preventing buffer overflows.

Figure 6:
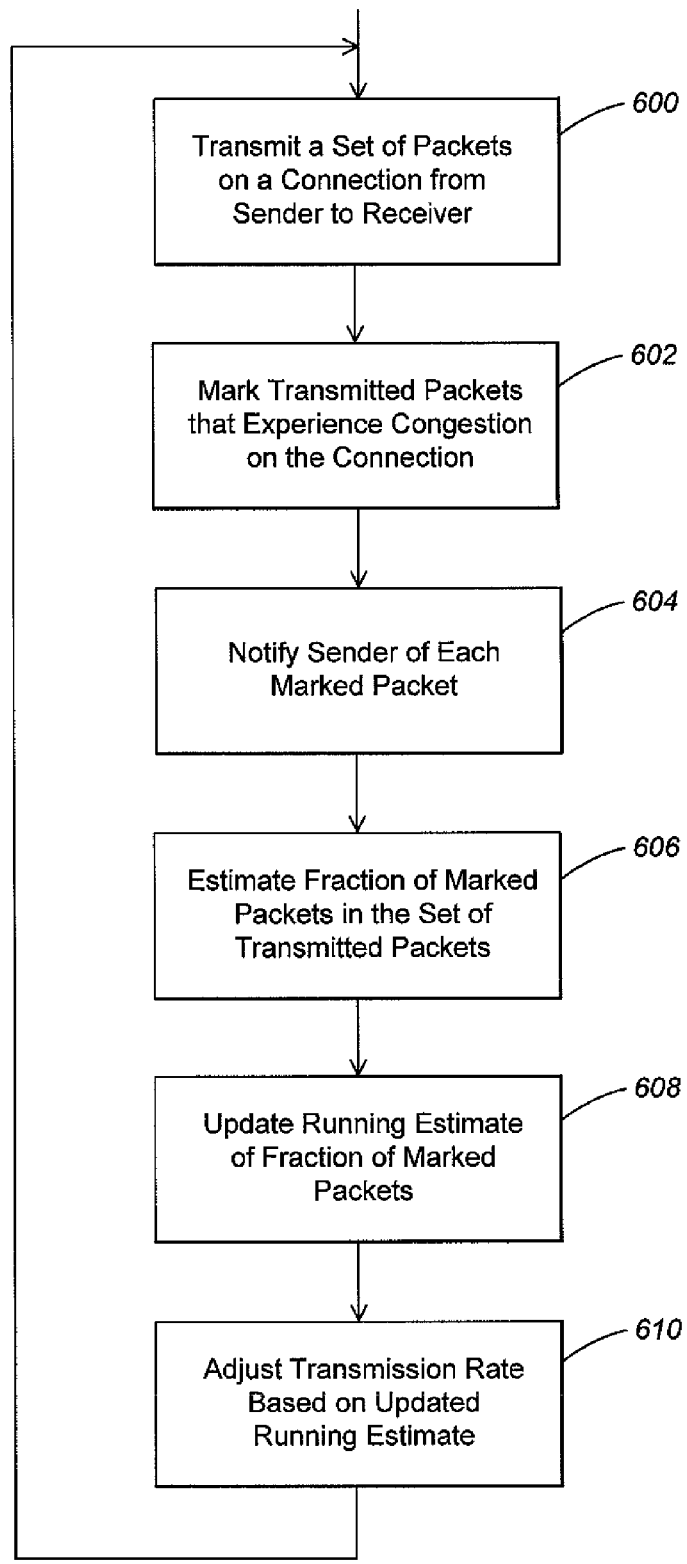
FIG. 6 is a flow chart that illustrates operation of a congestion control algorithm in accordance with embodiments of the invention.

A flow chart that summarizes the operation of the DCTCP algorithm is shown in FIG. 6. The operations of FIG. 6 are described with reference to the network diagram of FIG. 3. In act 600, sender 300 transmits a set of packets 302 to sender 310 on connection 312. The set of packets may be the data packets transmitted during a transmission window.

In act 602, transmitted data packets that experience congestion are marked, for example by setting a CE codepoint. As described above, the transmitted packets are marked if the queue size in a switch, such as switches 320 and 322, exceeds a threshold K. Otherwise, the data packets are not marked. A marked data packet 306 is shown in FIG. 3.

In act 604, receiver 310 notifies sender 300 of each marked packet in the set of data packets received by receiver 310. In the case where each data packet is acknowledged individually, the receiver 310 may set an ECN-Echo bit in the ACK packets 304 to indicate that marked packets were received. Unmarked data packets are acknowledged without setting the ECN-Echo bit. Thus, sender 300 receives ACK packets, and the number of packets having ECN-Echo bits set is based on the extent of congestion experienced by the set of packets.

In act 606, sender 300 estimates the fraction of marked packets in the set of transmitted data packets. This information is derived from the ECN-Echo bit in each of the ACK packets returned by receiver 310. Thus, sender 300 derives multi-bit information from single-bit information (ECN-Echo bit) contained in each of the ACK packets.

In act 608, a running estimate of the fraction of marked packets is updated by sender 300 using Equation (1) above. In act 610, the transmission rate of subsequent sets of data packets is adjusted based on the updated running estimate determined in act 608. As discussed above, the transmission rate may be decreased based on the fraction of marked packets, which represents the extent of congestion on network connection 312.

In the foregoing description of the DCTCP algorithm, transmitted data packets are marked at a switch in the network connection when the queue size at the switch exceeds a threshold K. The set of marked and unmarked packets is used to estimate the extent of congestion on the network connection. In other embodiments, congestion inferer 352 and congestion marker 354 shown in FIG. 3 are used as an alternate to marking of packets at the switch.

The congestion inferer 352 observes the packets received by receiver 310. It estimates the utilization of the link connecting the receiver 310 to the last hop switch 322 by recording the time at which each packet or group of packets is received and the number of received packets. The link capacity in bits per second is known, so congestion inferer 352 obtains an estimate of link utilization by dividing the bits received during a duration of time by the capacity multiplied by the duration. Typical durations may be 10 milliseconds, 100 milliseconds, or 500 milliseconds. If the link utilization is above threshold, typically 90 to 95 percent, then the congestion inferer 352 determines that there must be a sufficiently long queue at the last hop switch 322 that congestion exists at the switch. The system then proceeds as if all packets received during that duration and the next duration were received with the CE congestion bit set. The congestion marker 354 returns ACK packets to the sender 300 with ECN-Echo bits set. When the estimated utilization is above the threshold value, the sender 300 estimates the extent of congestion based on the fraction of marked packets and adjusts the transmission rate as described above.

Figures 8, 9:
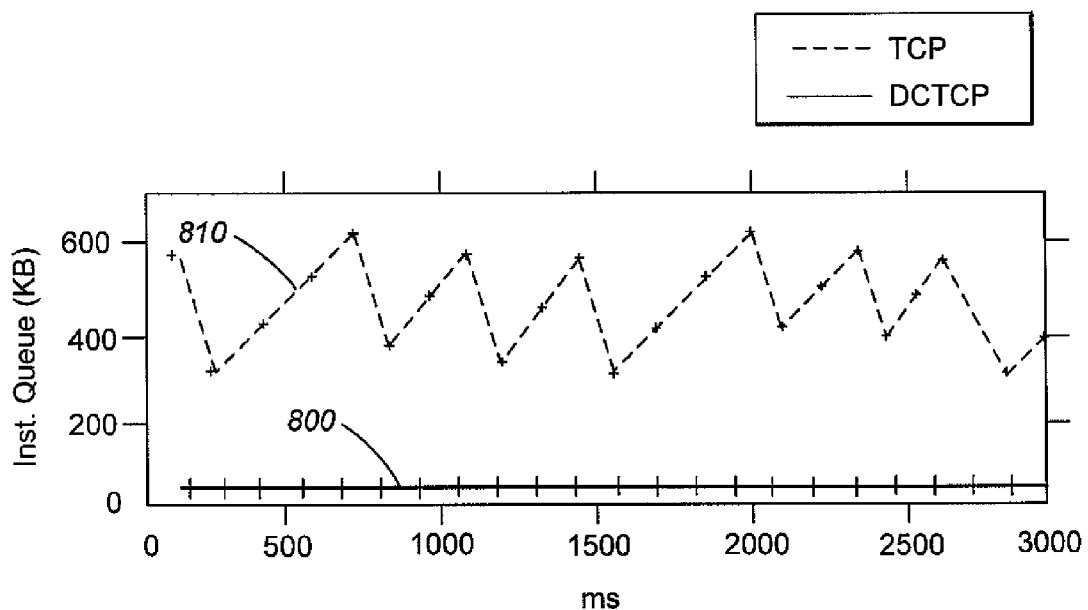
FIG. 8 is a plot of instantaneous queue length at a switch as a function of time, using a congestion control algorithm in accordance with embodiments of the invention and using conventional TCP.
FIG. 9 is a table that illustrates examples of operation of a congestion control algorithm in accordance with embodiments of the invention and operation of conventional TCP.

FIG. 8 illustrates the effectiveness of the DCTCP algorithm in achieving full throughput, while taking up a small part of the switch packet buffer, as compared to TCP. In FIG. 8, curve 800 represents the instantaneous queue length as a function of time for the DCTCP algorithm, and curve 810 represents the instantaneous queue length for conventional TCP. The queue length was measured on a Broadcom Triumph switch. Two long flows were launched from distinct 1 Gbps ports to a common 1 Gbps port. The switch had dynamic memory management enabled, allowing flows to a common receiver to dynamically occupy up to 700 Kb of buffer.

A comparison of the performance of the DCTCP algorithm and conventional TCP is shown in FIG. 9. In a first example, eight packets in a set of ten packets had the ECN-Echo bit set. The DCTCP algorithm cuts the transmission window by 40 percent, whereas TCP cuts the transmission window by 50 percent. In a second example, one packet in a set of ten packets had the ECN-Echo bit set. The DCTCP algorithm cuts the transmission window by five percent, whereas TCP cuts the transmission window by 50 percent. These examples illustrate that the DCTCP algorithm adapts to the extent of congestion, as indicated by the fraction of marked packets, whereas TCP cuts the transmission window by 50 percent in the presence of any congestion.

In one embodiment, transmission rate controller 342, congestion inferer 352, congestion marker 354 and ECN Echoer 350 are incorporated into the Transmission Control Protocol and implemented in the network stack of server 300 and receiver 310. This embodiment has an advantage that any application 340 using a TCP connection will receive the benefits of the invention. In another embodiment, these elements are incorporated into libraries used by the application 340. In this embodiment, the application on the receiver 310 or the library is responsible for sending congestion information 304 to the sender 300. The feedback can be exactly the amount of congestion experienced and can be sent as frequently as desired—once per RTT would be optimal. This embodiment has an advantage that an application 340 that communicates using something other than a TCP connection, for example, a UDP stream of data, can receive the benefits of the invention. Other embodiments are also possible, such as incorporating the transmission rate controller 342 into the application 340 and the congestion inferer 352, congestion marker 354 and ECN Echoer 350 into the network stack of the receiver 310.

In another embodiment, the transmission rate controller 342 is incorporated into the network stack or TCP code of the receiver 310 and the receiver controls the rate at which the sender 300 sends data by setting the TCP receiver advertised window in the acknowledgement packets 304 it sends to the sender 300. The sending rate is increased by increasing the advertised receiver window and is decreased by decreasing the advertised receiver window.

Prior work known as ECN-hat reacts to the average number of ECN notifications received over a period of time. In ECN-hat, the TCP sender keeps a running average of the number of ECN notifications it has received. When the TCP sender receives the first ECN Notification, it reduces the congestion window based on the current average. It will not adjust the congestion window again until at least a congestion window of data has been sent. Any additional ECN Notifications received until a congestion window of data has been sent are accumulated into the running average of ECN Notifications, but do not cause further adjustment to the congestion window. The invention differs from ECN-hat by introducing a new ECN-Echoer 350, an optional congestion inferer 352 and congestion marker 354, and using different rules in the transmission rate controller 342 as shown in equations (1) and (2). The DCTCP algorithm also specifies that packets may be marked in a network switch 320, 322 whenever the instantaneous queue length is greater than threshold K and how threshold value K should be determined (for example, equations (3) and (4)). The invention also explains how the transmission rate controller 342 can be incorporated into the application 340 or a communication library used by the application.

Prior work known as Random Early Drop (RED) or Random Early Marking (REM) operates by the network switches computing a smoothed estimate of the length of the packet queue. When the smoothed queue length is greater than a value minimum-threshold and less than a value maximum-threshold and a packet arrives at the queue, the packet is dropped (in RED) or marked (in REM) with a probability computed as max-drop-rate times (maximum-threshold−current smoothed queue length−minimum-threshold) divided by (maximum-threshold−minimum-threshold) where max-drop-rate, minimum-threshold and maximum-threshold are parameters that must be provided to the switch. The key difference between RED, REM, and its variants (for example, PI and other forms of Active Queue Management) are that in those systems the essential part of the rate controller that determines when a sender's congestion window should be cut is located on the switch where it does not have any per-flow information and so must use probabilistic formulas like those in this paragraph (when the sender cuts its congestion window, it is always by a factor of 2). As a result, the controller is largely ineffective in practice. In the invention, the transmission rate controller 342 is located on the sender 310 or on the receiver 310 where it can associate the congestion notifications with a particular flow and track the congestion information for each flow over time.

The invention has been shown and described in connection with data center applications. However, the invention is not limited to data center applications and may be utilized in other computer networks, such as Wide Area Networks (WAN). Although the sender 300 has been described as estimating and updating a measure of congestion on the network connection, it will be understood that these operations can be performed by the receiver 310, with the result sent to the sender 300 for adjusting the transmission rate.

Figure 10:
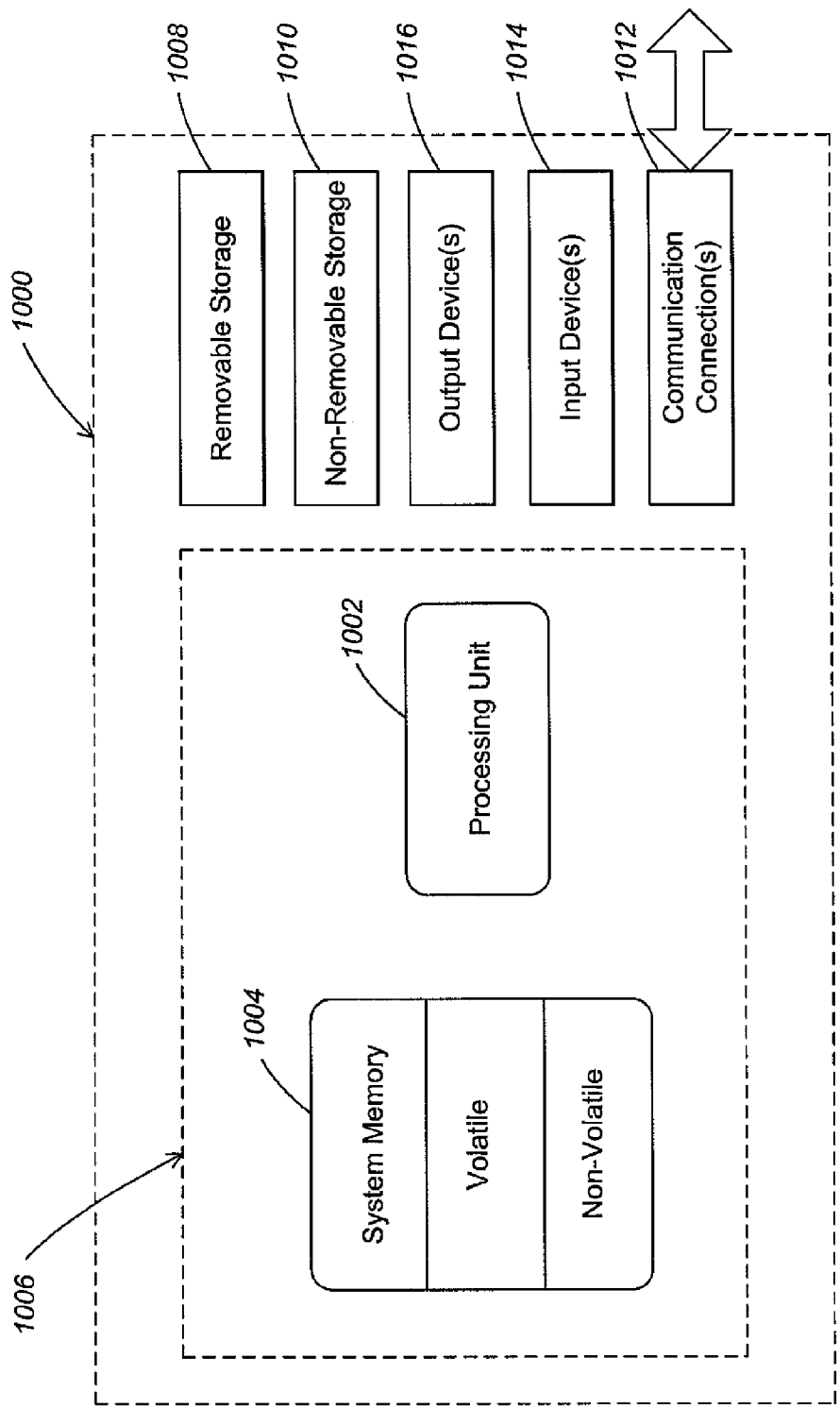
FIG. 10 is a block diagram generally illustrating an example of a computer system in which the present invention may be implemented.

With reference to FIG. 10, an exemplary system for implementing the invention includes a computing device, such as computing device 1000. In its most basic configuration, computing device 1000 typically includes at least one processing unit 1002 and memory 1004. Depending on the exact configuration and type of computing device, memory 1004 may be volatile (such as RAM), non-volatile (such as ROM, flash memory, etc.) or some combination of the two. This most basic configuration is illustrated in FIG. 10 by dashed line 1006. Additionally, device 1000 may also have additional features/functionality. For example, device 1000 may also include additional storage (removable and/or non-removable) including, but not limited to, magnetic or optical disks or tape. Such additional storage is illustrated in FIG. 10 by removable storage 1008 and non-removable storage 1010. Computer storage media includes volatile and nonvolatile, removable and non-removable media implemented in any method or technology for storage of information such as computer readable instructions, data structures, program modules or other data. Memory 1004, removable storage 1008 and non-removable storage 1010 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 1000. Any such computer storage media may be part of device 1000.

Device 1000 may also contain communications connection(s) 1012 that allow the device to communicate with other devices. Device 1000 may also include input device(s) 1014 such as keyboard, mouse, pen, voice input device, touch input device, etc. Output device(s) 1016 such as a display, speakers, printer, etc. may also be included. All these devices are well known in the art and need not be discussed at length.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method for controlling network congestion, comprising:
    transmitting a first set of data packets from a source computing device to a destination computing device at a first transmission rate;
    receiving, at the source computing device, information:
        that identifies each data packet of the first set of data packets that was received at the destination computing device without a congestion marking;
        that identifies each data packet of the first set of data packets that was received at the destination computing device with the congestion marking; and
        that indicates, for each of the data packets of the first set of data packets, whether that specific data packet was received at the destination computing device with or without the congestion marking, wherein the information is received via indications transmitted by the destination computing device according to a state machine that transmits an indication for:
            each series of M consecutive packets received by the destination computing device without the congestion marking, wherein M is greater than one;
            each series of N consecutive packets received by the destination computing device with the congestion marking, wherein N is greater than one;
            each particular packet received by the destination computing device without the congestion marking where a last packet received by the destination computing device relative to that particular packet was received by the destination computing device with the congestion marking; and
            each given packet received by the destination computing device without the congestion marking where the last packet received by the destination computing device relative to that given packet was received by the destination computing device with the congestion marking;
    determining an adjusted transmission rate, that is different from the first transmission rate, based at least in part on the received information; and
    transmitting a second set of data packets from the source computing device to the destination computing device at the adjusted transmission rate.

2. The method of claim 1, wherein the received information also identifies a sequence of the data packets of the first set of data packets that were received at the destination computing device with the congestion marking and without the congestion marking.

3. The method of claim 1, wherein the congestion marking is an indication of a queue length at an intermediary computing device between the source computing device and the destination computing device.

4. The method of claim 1, wherein the congestion marking is an indication of a utilization of a link between the source computing device and the destination computing device.

5. The method of claim 1, wherein the adjusted transmission rate is based at least in part on a ratio of data packets received at the destination computing device without the congestion marking to data packets received at the destination computing device with the congestion marking.

6. The method of claim 5, wherein the adjusted transmission rate is based at least in part on a reduction of a length of a data packet transmission window by a factor of $(1-\alpha/2)$, wherein $\alpha$ is a smoothed estimate of the ratio over multiple sets of data packets.

7. The method of claim 5, wherein the adjusted transmission rate is in accordance with:

$$\alpha_{i+1} = (1-g)\alpha_i + gF$$

where $\alpha$ is a smoothed estimate of the ratio over multiple sets of data packets, F is the ratio for the first set of data packets, and g is a weight given to new values of $\alpha$ relative to past values of $\alpha$.

8. The method of claim 1, wherein the method further comprises:
    updating the adjusted transmission rate at a frequency that is based on a round-trip-time between the source computing device and the destination computing device.

9. A computer storage memory encoded with instructions for performing operations to control network congestion, the operations comprising:
    receiving a first set of data packets from a source computing device at a destination computing device; and
    transmitting, from the destination computing device, indications to the source computing device according to a state machine that transmits an indication to the source computing device for:
        each series of M consecutive packets received by the destination computing device without the congestion marking, wherein M is greater than one;
        each series of N consecutive packets received by the destination computing device with the congestion marking, wherein N is greater than one;

each particular packet received by the destination computing device without the congestion marking where a last packet received by the destination computing device relative to that particular packet was received by the destination computing device with the congestion marking; and each given packet received by the destination computing device without the congestion marking where the last packet received by the destination computing device relative to that given packet was received by the destination computing device with the congestion marking, wherein each of the indications indicates, for each data packet received by the destination computing device from the source computing device since transmission of a last indication, whether that specific data packet was received at the destination computing device with or without the congestion marking.

10. The computer storage memory of claim 9, wherein the information also identifies a sequence of the data packets of the first set of data packets that were received at the destination computing device with the congestion marking and without the congestion marking.

11. The computer storage memory of claim 9, wherein the congestion marking is indicative of a queue length at an intermediary computing device between the source computing device and the destination computing device.

12. The computer storage memory of claim 9, wherein the congestion marking is indicative of a utilization of a link between the source computing device and the destination computing device.

13. The computer storage memory of claim 9, wherein the operations further comprise:
receiving a second set of data packets from the source computing device at the destination computing device, the second set of packets having been transmitted at a transmission rate based at least in part on the transmitted indications.

14. The computer storage memory of claim 9, wherein the operations further comprise:
receiving a second set of data packets from the source computing device at the destination computing device, the second set of packets having been transmitted at a transmission rate based at least in part on a ratio of data packets received at the destination computing device without the congestion marking to data packets received at the destination computing device with the congestion marking.

15. The computer storage memory of claim 9, wherein the operations further comprise:
receiving a second set of data packets from the source computing device at the destination computing device, the second set of packets having been transmitted at a transmission rate that is based at least in part on an equation:

$$(1-\alpha/2)$$

where $\alpha$ is a smoothed estimate of a ratio over multiple sets of data packets.

16. The computer storage memory of claim 9, wherein the operations further comprise:
receiving a second set of data packets from the source computing device at the destination computing device, the second set of packets having been transmitted at a transmission rate that is based at least in part on an equation:

$$\alpha_{i+1} = (1-g)\alpha_i + gF$$

where $\alpha$ is a smoothed estimate of a ratio over multiple sets of data packets, F is the ratio for the first set of data packets, and g is a weight given to new values of $\alpha$ relative to past values of $\alpha$.

17. An apparatus for controlling network congestion, comprising a memory and a processor that are respectively configured to store and execute instructions that:
transmit a first set of data packets from a source computing device to a destination computing device at a first transmission rate;
receive, at the source computing device, information:
that identifies each data packet of the first set of data packets that was received at the destination computing device without a congestion marking;
that identifies each data packet of the first set of data packets that was received at the destination computing device with the congestion marking; and
that indicates, for each of the data packets of the first set of data packets, whether that specific data packet was received at the destination computing device with or without the congestion marking;
determine an adjusted transmission rate, different from the first transmission rate, based at least in part on the received information; and
transmit a second set of data packets from the source computing device to the destination computing device at the adjusted transmission rate, wherein:
the adjusted transmission rate is determined as a function of at least:
a ratio of data packets received at the destination computing device without the congestion marking to data packets received at the destination computing device with the congestion marking; and
a reduction of a length of a data packet transmission window by a factor of a smoothed estimate of the ratio over multiple sets of data packets; and
receiving the information includes:
receiving indications transmitted by the destination computing device according to a state machine that transmits an indication for:
each series of M consecutive packets received by the destination computing device without the congestion marking, wherein M is greater than one;
each series of N consecutive packets received by the destination computing device with the congestion marking, wherein N is greater than one;
each particular packet received by the destination computing device without the congestion marking where a last packet received by the destination computing device relative to that particular packet was received by the destination computing device with the congestion marking; and
each given packet received by the destination computing device without the congestion marking where the last packet received by the destination computing device relative to that given packet was received by the destination computing device with the congestion marking.

18. The apparatus of claim 17, wherein:
the adjusted transmission rate is determined as a function of at least:
a smoothed estimate, over multiple sets of data packets, of a ratio of data packets received at the destination computing device without the congestion marking to data packets received at the destination computing device with the congestion marking; and a weight of new values of the smoothed estimate relative to past values of the smoothed estimate.

19. The apparatus of claim 17, wherein the congestion marking is an indication of a queue length at an intermediary computing device between the source computing device and the destination computing device and/or an indication of a utilization of a link between the source computing device and the destination computing device.

20. The method of claim 17, wherein the adjusted transmission rate is based at least in part on a smoothed estimate of the ratio over multiple sets of data packets and a relative importance of a current value of the smoothed estimate to past values of the smoothed estimate.

* * * * *